Jan. 9, 1968     H. SERNETZ     3,362,760
ROLLER CONSTRUCTION PARTICULARLY FOR CONVEYORS
Filed June 29, 1965
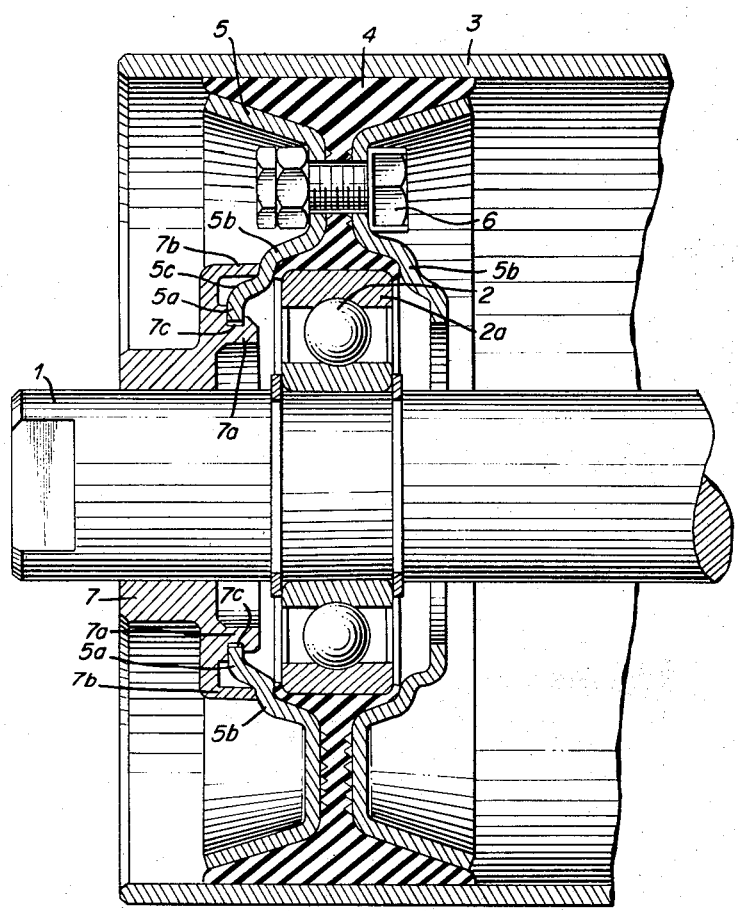
INVENTOR.
HEINZ SERNETZ

United States Patent Office 3,362,760
Patented Jan. 9, 1968

3,362,760
ROLLER CONSTRUCTION PARTICULARLY
FOR CONVEYORS
Heinz Sernetz, Gleisdorf, Styria, Austria
Filed June 29, 1965, Ser. No. 467,966
Claims priority, application Austria, July 3, 1964,
A 5,734/64
4 Claims. (Cl. 308—187.1)

ABSTRACT OF THE DISCLOSURE

The construction of a roller element particularly for conveyor belts includes an annular resilient body which is adapted to engage within a roller sleeve at its outer periphery and against the outer surface of an outer race of a roller bearing at its inner periphery. The annular body is compressed in its position between the roller bearing and the roller sleeve by a tensioning disk which in accordance with the invention is provided with an intermediate radially extending and axially extending portion and with an end which extends radially into a groove defined by a labyrinth seal which is affixed to the shaft. The labyrinth seal includes an axially extending portion which engages the intermediate portion of the tensioning disk and the construction is such that the rotation of the tensioning disk will centrifugally deflect any dirt or other foreign matter away from the groove of the labyrinth and thus insure that the bearing is always maintained free of all dust and dirt.

Summary of the invention

This invention relates, in general, to the construction of roller elements and, in particular, to a new and useful conveyor belt roller having a construction which provides dust-free operation of the roller bearings.

Conveyor belt rollers are cylindrical carrier rollers which serve to support conveyor belts and which rotate about a stationary rotational axis or axle. Such conveyor belts are often used for transporting granular goods or powdered goods, for example, sand, ash, ore and the like, stony or rocky materials, pulverized coal, coal pieces etc. Such goods are sometimes transported in a wet condition. In order to reduce the energy required for driving the roller, the rollers are usually mounted with anti-friction or roller bearings. It is difficult to provide adequate sealing of such bearings against the penetration and entry of dust and moisture. As is well known, roller bearings or anti-friction bearings are particularly sensitive to dust.

Conveyor belt rollers customarily have at their ends closure discs or plates for compressing elastic pressure members which are situated between the axle bearings and the roller jacket and which support the jacket through pressure engagement by radial enlargement of the pressure members. It is possible to arrange a sealing body which may consist of rubber on the stationary axis of the roller.

In accordance with the present invention, a very effective sealing for the bearings for conveyor belt rollers is provided. This sealing consists of a simple, useful configuration which includes a closure disc which is adapted to bear against a resilient member which holds one rotatable race of a bearing to the outer roller jacket. The closure disc includes a skirt portion which is adapted to ride in a groove of a fixed end closure member or labyrinth sealing member which is fixed on the axle. The sealing element is advantageously constructed in the manner of a labyrinth seal. The inner rim of the closure disc engages in a radial recess in the closure body with very little play and provides a complete seal of the roller bearings against dust and dirt. The invention is particularly advantageous for use for conveyor belt rollers in which the outer roller element or jacket is advantageously supported by an axially compressed resilient member. The inner rim or closure disc for tensioning this member is advantageously arranged to ride in the groove of the enclosure plate.

Accordingly it is an object of the invention to provide an improved roller construction, including means for aiding in the resilient support of the roller about a movable race of a roller bearing which rides in an enclosure member in a manner to provide a seal for the roller bearings.

A further object of the invention is to provide a roller construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The only drawing is a partial sectional view of a conveyor roller constructed in accordance with the invention.

Referring to the drawing, in particular, the invention embodied therein comprises a fixed roller shaft or axle 1 upon which is mounted a roller bearing 2 with the movable race 2a held in position by an annular body or elastic member 4 which is disposed between the race 2a and an outer jacket or roller sleeve element 3. The annular body 4 is of an elastic material and is axially compressed between two tensioning discs 5 by means of through bolts and nuts indicated 6.

In accordance with the invention, a closure body or labyrinth sealing member 7 is affixed to the axle 1 and it is provided with first or inner axially extending flange portion 7a having a radially extending annular recess 7c into which a leg portion 5a of a tensioning disc 5 extends. In addition, the closure member 7 is provided with a second or outer axially extending flange portion 7b spaced radially from the first which rides over a shoulder formation 5c formed on the disc in close running fit with a radial portion 5b of the disc 5. The disc 5 and the sealing member cooperate to ensure that sand or dirt particles will not be able to move into the sealing region defined around the roller bearings 2. Any dirt or sand which has a tendency to move in the direction of the sealed bearings will be directed away because of the centrifugal force in such area produced by the rotating disc 5. In the embodiment indicated, the body 7 forms a labyrinth-type sealing construction with the disc 5. The construction is such that the regions between 5a and 5c form a first labyrinth sealing while the regions 5c to 5d of the disc 5 form a second labyrinth sealing with the labyrinth body 7.

Extensive practical tests have been carried out with the construction provided by the present invention. Such tests have been conducted under intensionally difficult operating conditions and using a number of different types of goods which were conveyed under different drying conditions and temperature conditions. The tests have conclusively demonstrated that an ejection of the extraneous dirt bodies does, in fact, take place by the action of the improved sealing effected by the disc 5 in the labyrinth member 7. The construction operates even over a long period of time and under difficult operations conditions in a manner to maintain the roller bearings 2 completely clean. There is no practical necessity for having a separate sealing labyrinth construction at the inner side of the ball bearings 2, but such a construction may be advantageous if it is desired to fill the roller bearings completely with a grease.

Thus, the construction provides a means for moving extraneous particles such as dust and dirt outwardly away from the roller bearings of a conveyor wheel construction.

While a specific embodiment of the invention has been shown and described in detail to illustrate the application of the inventive principles, it will be understood that the invention may be embodied otherwise without departing from such principles.

What is claimed is:

1. A roller construction particularly for conveyors comprising, a fixed axle member, a roller bearing including an inner roller bearing race held on said axle, a race of ball bearings rotatable on said inner race and an outer race rotatable on said ball bearings, a tubular roller jacket, an annular body of resilient material engaged on the exterior of said outer race and having an outer flange portion engaged with the interior wall of said roller jacket, at least one tensioning disc abutting against an end face of said annular body, and a closure body carried on said axle and having a first inner flange portion extending axially and having a radially extending groove defined therein, said tensioning disc having an intermediate radially extending portion followed by an axially extending portion and an end extending into and substantially filling the radially extending groove of said closure body, said closure body also having an outer flange portion radially spaced from said flange portion substantially engaging said intermediate axially extending portion of said tensioning disc whereby upon rotation of said tension disc with said outer race dirt is deflected centrifugally away from the groove of said closure body.

2. A roller construction particularly for conveyors comprising, a fixed axle member, a roller bearing including an inner roller bearing race held on said axle, a race of ball bearings rotatable on said inner race and an outer race rotatable on said ball bearings, a tubular roller jacket, an annular body of resilient material engaged on the exterior of said outer race having an outer flange portion engaged with the interior wall of said roller jacket, a first tensioning disc abutting against an end face of said annular body, a second tensioning disc abutting against an opposite end face of said annular body, bolt means clamping said tensioning disc to said annular body to urge said annular body into tight engagement with said tubular roller jacket and said outer race respectively, a closure body carried on said axle and having a first inner flange portion extending axially and having a radially extending groove defined therein, said first tensioning disc having an intermediate radially extending portion followed by an axially extending portion and an end extending into and substantially filling the radially extending groove of said closure body, said closure body also having an outer flange portion radially spaced from said flange portion substantially engaging said intermediate axially extending portion of said tensioning disc whereby upon rotation of said tension disc with said outer race dirt is deflected centrifugally away from the groove of said closure body.

3. A roller construction particularly for conveyors comprising, a fixed axle member, a roller bearing including an inner roller bearing race held on said axle, a race of ball bearings rotatable on said inner race and an outer race rotatable on said ball bearings, a tubular roller jacket, an annular body of resilient material engaged on the exterior of said outer race and engaged with the interior wall of said roller jacket, at least one tensioning disc abutting against an end face of said annular body, bolt means clamping said tensioning disc to said annular body to urge the flange portions of said annular body into tight engagement with said tubular roller jacket and said outer race respectively, a closure body carried on said axle and having a first inner flange portion extending axially and having a radially extending groove defined therein, said tensioning disc having an intermediate radially extending portion followed by an axially extending portion and an end extending into and substatially filling the radially extending groove of said closure body, said closure body also having an outer flange portion radially spaced from said flange portion and defining a cavity therewith, said outer flange portion substantially engaging said intermediate axially extending portion of said tensioning disc whereby upon rotation of said tension disc with said outer race dirt is deflected centrifugally away from the groove of said closure body.

4. A roller construction particularly for conveyors comprising, a fixed axle member, a roller bearing including an inner roller bearing race held on said axle, a race of ball bearings rotatable on said inner race and an outer race rotatable on said ball bearings, a tubular roller jacket, an annular body of resilient material having a first inner flange engaged on the exterior of said outer race, a central web portion, and an outer flange portion wider than said inner flange portion and engaged with the interior wall of said roller jacket, at least one first tensioning disc abutting against an end face of said annular body, a second tensioning disc abutting against an opposite end face of said annular body, bolt means clamping said tensioning disc to said annular body to urge said flange portions into tight engagement with said tubular roller jacket and said outer race respectively, a closure body carried on said axle and having a first inner flange portion extending axially and having a radially extending groove defined therein, said first tensioning disc having an intermediate radially extending portion followed by an axially extending portion and an end extending into and substantially filling the radially extending groove of said closure body, said closure body also having an outer flange portion radially spaced from said flange portion and defining a cavity therewith, said outer flange portion substantially engaging said intermediate axially extending portion of said tensioning disc whereby upon rotation of said tension disc with said outer race dirt is deflected centrifugally away from the groove of said closure body.

References Cited

UNITED STATES PATENTS

| | | | |
|---|---|---|---|
| 1,978,739 | 10/1934 | Brittain | 308—187.1 |
| 2,566,322 | 9/1951 | Flowers | 308—187.1 |
| 3,097,022 | 7/1963 | Sernetz | 308—20 |

EDGAR W. GEOGHEGAN, *Primary Examiner.*

FRANK SUSKO, *Examiner.*